G. A. PARKER.
LAND TORPEDO.
APPLICATION FILED AUG. 26, 1918.
1,303,717.
Patented May 13, 1919.
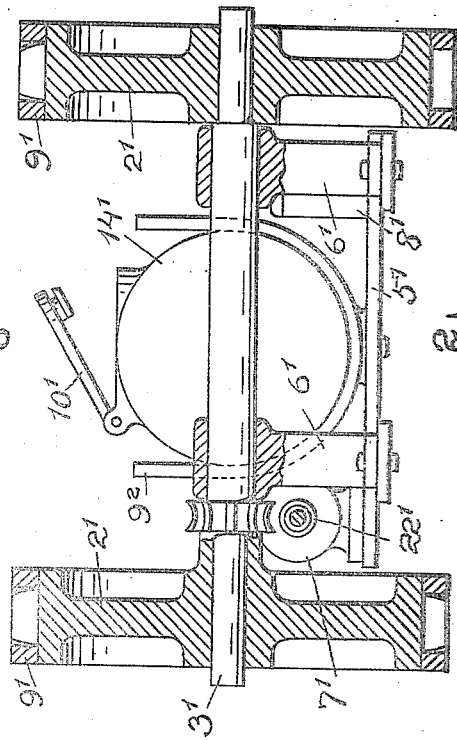
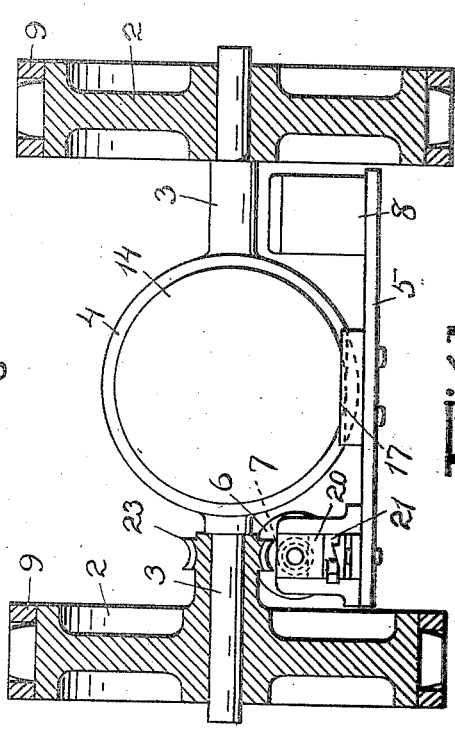
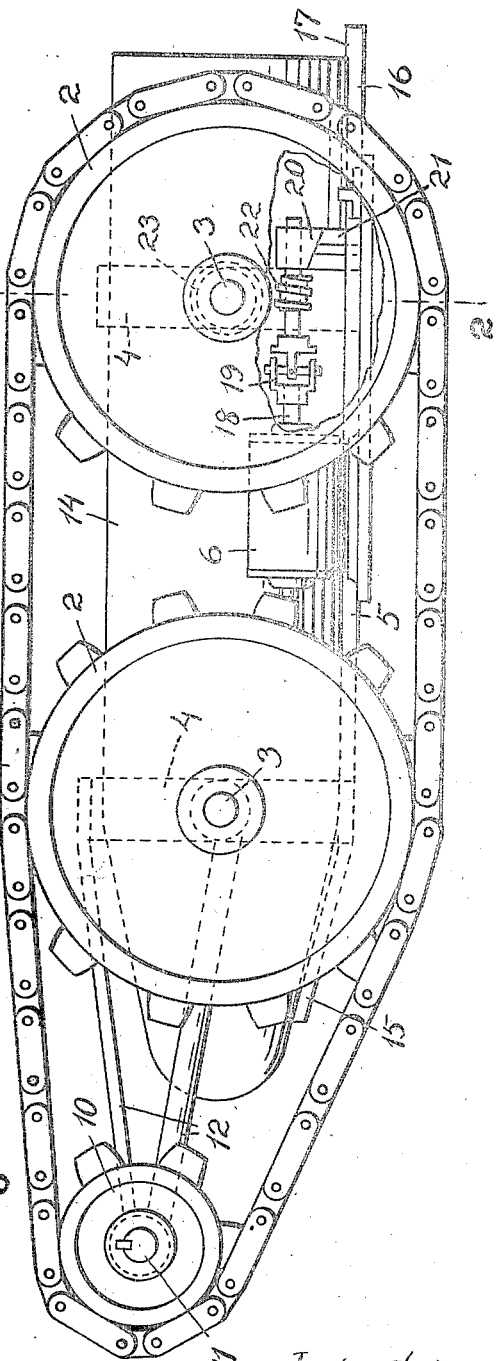
Inventor.
Geo. A. Parker.
by E. W. Anderson
Attorney.

UNITED STATES PATENT OFFICE.

GEORGE A. PARKER, OF BROCKTON, MASSACHUSETTS.

LAND-TORPEDO.

1,303,717. Specification of Letters Patent. Patented May 13, 1919.

Application filed August 26, 1918. Serial No. 251,428.

*To all whom it may concern:*

Be it known that I, GEORGE A. PARKER, a citizen of the United States, resident of Brockton, in the county of Plymouth and State of Massachusetts, have made a certain new and useful Invention in Land-Torpedoes; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention.

Fig. 2 is a section on the line 2—2, Fig. 1.

Fig. 3 is a similar view of a modification.

The invention has relation to land torpedoes, self-propelled and designed for use in transmitting torpedoes to meet the enemy in land combats, rather than dropping the torpedoes from above, as from an airship or from an aerial carrier.

The invention consists in the novel construction and combinations of parts, as hereinafter set forth.

In the accompanying drawings, illustrating the invention, the numeral 2 designates the four wheels of the carrier, each having a stub shaft 3 and an annulus or ring-form member 4, connecting the stub shafts of opposite wheels. The two annuli, which have their axes alined, are connected at the bottom by a platform 5, suspended from the annuli, an engine 6, mounted upon the platform at one side thereof, having a worm gear drive connection 7 with one of the rear wheels 2, the opposite side of the platform carrying a gasolene tank or battery-containing box 8, according to whether an explosive or an electric engine is to be employed.

The four wheels 2 are sprocket wheels, and passing over wheels at each side is an endless sprocket chain 9, the chains being designed, through contact with the ground, to propel the carrier or vehicle in the movement around the wheels initiated by the driving connection of the engine with one of the rear wheels, the chain at the driven side transmitting the driving impulse to the forward wheel at this side, and thence to a forwardly located smaller sprocket wheel 10, elevated from the ground, and around which the chain passes in its return.

The sprocket wheel 10 is fast upon one end of a transverse shaft 11, the latter carrying at its other end a sprocket wheel similar to the wheel 10, the chain at the opposite side of the machine passing around this second sprocket wheel, and thereby having the driving impulse transmitted thereto, so that in this way both chains and all four tractor wheels are positively driven from the engine.

The shaft 11 is suspended from forwardly extending arms 12, attached at their rear ends to the forward annulus 4, and inasmuch as the tractor chains extend upwardly from the forward tractor wheel to the nose wheels 10, the carrier is rendered capable of climbing over obstructions, and also, owing to the length of the carrier, which is of course measured by the length of the chains, the carrier is rendered capable of crossing trenches or shell holes.

The torpedo is shown at 14, and is designed to be slipped into engagement with the two annuli 4, 4 from the rear end of the machine, a forwardly extending arm 15 of the forward annulus having limiting engagement with the nose of the torpedo to stop its forward movement, and a rearwardly extending arm 16 of the rear annulus having a slight spring action, from the annulus as a center, and carrying a rear tooth 17, designed to spring up in the rear of the torpedo to hold it from moving backwardly.

The engine shaft 18 has a pivotal or universal joint 19, and is provided at its free end with a cam block 20, with which a cam block 21 has engagement to raise and lower the pivotal portion of the shaft and to thereby engage and disengage the worm 22 of the engine shaft with the worm wheel 23 of the stub shaft of the rear wheel.

A modification of the invention is shown in Fig. 3 of the drawings, wherein the opposite wheels 2' have a transverse shaft connection 3', upon which the wheels are fast, the engine driving said transverse shaft 3' in the same way as in the first case stated, that is to say by a worm drive, the worm wheel of which is shown at 22'.

The rear shaft or axle 3' being driven, the tractor sprocket wheels 2' in rear of the machine will be driven thereby, and will, through the sprocket chains 9', drive the front wheels and the entire machine.

In the case of this modification, the platform 5' will be suspended from hangers 6', hung from the transverse shafts, the engine 7' and the battery box or gasolene tank 8' being mounted upon this platform.

9² designate U-shaped holders fitting between the shafts 3' and open at the tops thereof, so that the torpedo may be slipped or dropped in from above, being suitably held against movement in either direction endwise. These U-form holders are of course mounted upon the platform 5'.

The fuse for the torpedo is preferably protected in a chamber of the torpedo, said chamber having a hinged cover or door 10', suitably secured in close position and thereby protecting the fuse from being tampered with. Either form of the invention may be provided with the door and chamber for protecting the fuse.

The fuse box or chamber is preferably provided with suitable graduations (not shown).

I claim:—

1. In a land torpedo, forward and rear load supporting wheels having shafts, nose wheels elevated from the ground, all of said wheels of the form of sprocket wheels, tractor sprocket chains passing over the wheels at each side of the machine, a torpedo carrier suspended from the shafts of the forward and rear wheels, and a driving engine mounted upon said carrier.

2. In a land torpedo, forward and rear load supporting wheels, nose wheels having shafts elevated from the ground, all of said wheels being sprocket wheels, tractor chains of sprocket character passing over the wheels, one chain at each side of the machine, a torpedo carrier suspended from the shafts of the forward and rear wheels, said carrier having forward and rear arcuate or circular members axially alined and with which the torpedo is designed to be slipped into engagement, the axes of said members on the same level as the axle shafts of the forward and rear wheels, and a driving engine.

In testimony whereof I affix my signature, in presence of two witnesses.

GEORGE A. PARKER.

Witnesses:
EDWARD P. NEAPEY,
THOMAS W. PRINCE.